United States Patent
Kim et al.

(10) Patent No.: US 12,509,389 B2
(45) Date of Patent: *Dec. 30, 2025

(54) ENAMEL COMPOSITION, METHOD FOR PREPARATION THEREOF AND COOKING APPLIANCE USING SAME

(71) Applicant: LG Electronics Inc., Seoul (KR)

(72) Inventors: Ju Hyeong Kim, Seoul (KR); Jaekyung Yang, Seoul (KR); Taeho Kim, Seoul (KR); Taehee Kim, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1058 days.

This patent is subject to a terminal disclaimer.

(21) Appl. No.: 17/147,823

(22) Filed: Jan. 13, 2021

(65) Prior Publication Data

US 2021/0214271 A1    Jul. 15, 2021

(30) Foreign Application Priority Data

Jan. 15, 2020  (KR) .......................... 10-2020-0005538

(51) Int. Cl.
   *C03C 8/08*    (2006.01)
   *C03C 3/064*   (2006.01)
   (Continued)

(52) U.S. Cl.
   CPC .............. *C03C 8/08* (2013.01); *C03C 3/064* (2013.01); *C03C 3/118* (2013.01); *C23D 1/00* (2013.01);
   (Continued)

(58) Field of Classification Search
   CPC .......... C03C 8/08; C03C 3/064; C03C 3/118; C03C 2204/00; C03C 2207/00; C23D 1/00; F24C 15/107
   (Continued)

(56) References Cited

U.S. PATENT DOCUMENTS 3,114,646 A * 12/1963 Currie ..................... C03C 8/06
                                                      501/59
2010/0009177 A1  1/2010 Venkataramani et al.
(Continued)

FOREIGN PATENT DOCUMENTS

EP       0049041 A1 *  3/1985
EP       1167310         1/2002
(Continued)

OTHER PUBLICATIONS

Yilmaz, Yasin Bazkurt. Copoglu, Nurullah. Cicek, Bugra. Effect of Lithium Ratio on Adherence Performance of Vitreous Enamel Coatings. AKU J. Sci. Eng. 19(2019).*
(Continued)

*Primary Examiner* — Vivek K Shirsat
(74) *Attorney, Agent, or Firm* — Fish & Richardson P.C.

(57) ABSTRACT

The present disclosure relates to an enamel composition, a method for preparation thereof, and a cooking appliance using the same, which provide excellent cleaning performance, reduce a defect caused by carbon gases when an enamel coating is implemented on a base material made of cast iron, and provides excellent thermal shock resistance and durability. In the enamel composition according to the disclosure, components implementing glass and components having catalytic performance have an optimal component system, thereby ensuring excellent thermal shock resistance and durability. The enamel composition of the present disclosure has a component system that helps enamel cast iron as well as low carbon steel, thereby ensuring excellent cleaning performance, thermal shock resistance and durability. The enamel composition of the present disclosure is appropriate for a cooktop grate, a hob burner, and the like which directly contact a fire and are exposed to repetitive thermal shock.

19 Claims, 2 Drawing Sheets

(51) Int. Cl.
- *C03C 3/118* (2006.01)
- *C23D 1/00* (2006.01)
- *C23D 5/04* (2006.01)
- *F24C 15/00* (2006.01)
- *F24C 15/10* (2006.01)

(52) U.S. Cl.
CPC .......... *F24C 15/005* (2013.01); *F24C 15/107* (2013.01); *C03C 2204/00* (2013.01); *C03C 2207/00* (2013.01); *C23D 5/04* (2013.01)

(58) Field of Classification Search
USPC ...................................................... 126/39 B
See application file for complete search history.

(56) References Cited

U.S. PATENT DOCUMENTS

| | | | |
|---|---|---|---|
| 2013/0299482 A1* | 11/2013 | Kim .......................... | C03C 8/14 501/18 |
| 2018/0170797 A1 | 6/2018 | Gorecki et al. | |
| 2020/0270172 A1 | 8/2020 | Lee et al. | |
| 2021/0009814 A1* | 1/2021 | Kim .......................... | C03C 8/16 |

FOREIGN PATENT DOCUMENTS

| | | | | |
|---|---|---|---|---|
| EP | 2662340 | 11/2013 | | |
| EP | 3578525 | 12/2019 | | |
| EP | 3699154 | 8/2020 | | |
| EP | 3782962 | 2/2021 | | |
| JP | 2015-530337 | 10/2015 | | |
| KR | 10-2013-0030960 A | 3/2013 | | |
| KR | 101385975 | 4/2014 | | |
| KR | 10-2019-0071660 | 6/2019 | | |
| KR | 10-2019-0120965 | 10/2019 | | |
| WO | WO-2006083160 A1 * | 8/2006 | ............... | C03C 8/10 |
| WO | WO2019203565 | 10/2019 | | |

OTHER PUBLICATIONS

EP Extended European Search Report in European Appln. No. 21151616.6, dated Jun. 2, 2021, 8 pages.

Office Action in Korean Appln. No. 10-2020-0005538, mailed on Apr. 29, 2024, 18 pages (with English translation).

Notice of Allowance in Korean Appln. No. 10-2020-0005538, mailed on Dec. 20, 2024, 7 pages.

* cited by examiner

ENAMEL COMPOSITION, METHOD FOR PREPARATION THEREOF AND COOKING APPLIANCE USING SAME

CROSS-REFERENCE TO RELATED APPLICATION

This application claims priority to and the benefit of Korean Patent Application No. 10-2020-0005538, filed in Korea on Jan. 15, 2020, the disclosure of which is incorporated herein by reference in its entirety.

TECHNICAL FIELD

Disclosed herein are an enamel composition, a method for preparation thereof and a cooking appliance using the same.

BACKGROUND

Enamel is a substance, such as a glass glaze, that can be applied onto a surface of a metallic plate. Ordinary enamel may be used for cooking appliances, such as, for example, microwave ovens and ovens. Cooking appliances may include electric ovens, gas ovens, and other devices for cooking food or other items (hereinafter, collectively "food") using a heat source.

In certain cases, contaminants or the like may be produced during cooking and attached to an inner wall of a cavity of a cooking appliance. Accordingly, the inner wall of the cavity needs to be cleaned. Enamel may be coated on a surface of the inner wall of the cavity of the cooking appliance to help easily remove the contaminants attached to the cooking appliance.

Example known technologies for readily cleaning the inner wall of the cavity include pyrolysis (thermal decomposition), by which contaminants can be burned to ashes at a high temperature. Enamel compositions including such components as phosphorus pentoxide ($P_2O_5$), silicon dioxide ($SiO_2$), and boron oxide ($B_2O_3$), are known as an enamel composition to which the pyrolysis method can be applied.

Some enamel compositions can be cleaned when they are heated for about 4 hours approximately at 450 to 500° C. which is a temperature condition for pyrolysis. Accordingly, to clean such enamel compositions, a large amount of energy needs to be consumed.

Some enamel compositions can be cleaned only when they are heated at a high temperature. Thus, such enamel compositions can be applied only to the inside of a cooking appliance other than the outside of the cooking appliance.

Further, some enamel compositions need to be soaked in water for a predetermined period of time to remove contaminants such as beef tallow, pork lard, poultry fats, or other fats, thereby making cleaning cumbersome.

SUMMARY

Some implementations of the present disclosure provides an enamel composition, a method for preparation thereof and a cooking appliance using the same that may ensure excellent cleaning performance, restrict a defect caused by carbon gases when an enamel coating is implemented on a base material made of cast iron, and provide excellent thermal shock resistance and durability.

Some implementations of the present disclosure provides an enamel composition where components implementing glass and components having catalytic performance may have an optimal component system, thereby ensuring excellent thermal shock resistance and durability.

Some implementations of the present disclosure provides an enamel composition, a method for preparation thereof and a cooking appliance using the same that may ensure excellent cleaning performance, thermal shock resistance and durability, and that may be applied to a cooktop grate that directly contacts a fire and is exposed to repetitive thermal shock.

Objectives are not limited to the above ones, and other objectives and advantages that have not been mentioned can be clearly understood from the following description and can be more clearly understood from the implementations set forth herein. Further, the objectives and advantages can be realized via means and combinations thereof in the appended claims.

An enamel composition according to some implementations may ensure excellent cleaning performance, reduce a defect caused by carbon gases when an enamel coating is implemented on a base material made of cast iron, and provide excellent thermal shock resistance and durability.

In the enamel composition according to some implementations, components implementing glass and components having catalytic performance may provide an optimal component system, thereby ensuring excellent thermal shock resistance and durability.

Thus, the enamel composition according to some implementations may have a component system that helps enamel cast iron, such as high carbon steel including 1.5 or greater wt % of carbon, as well as low carbon steel, thereby ensuring excellent cleaning performance, thermal shock resistance and durability. Further, the enamel composition may be applied to a cooktop grate, a hob burner and the like directly contacting a fire and exposed to repetitive thermal shock.

To this end, the enamel composition according to some implementations may include 13 to 30 wt % of phosphorus pentoxide ($P_2O_5$), 20 to 45 wt % of silicon dioxide ($SiO_2$), 5 to 18 wt % of aluminum oxide ($Al_2O_3$), 10 or less wt % of zirconium dioxide ($ZrO_2$), 2 to 15 wt % of sodium oxide ($Na_2O$), 5 to 20 wt % of potassium oxide ($K_2O$), 1 to 10 wt % of lithium oxide ($Li_2O$), 5 or less wt % of sodium fluoride (NaF), 5 to 20 wt % of boron trioxide ($B_2O_3$), 5 or less wt % of titanium dioxide ($TiO_2$), and 10 or less wt % of vanadium oxide ($V_2O_5$).

In some examples, 5 or greater wt % of $Na_2O$ may be added.

The enamel composition according to some implementations may further include 5 or less wt % of one or more of cobalt tetraoxide ($CO_3O_4$), manganese oxide ($MnO_2$), nickel oxide (NiO) and iron oxide ($Fe_2O_3$).

In the enamel composition according to some implementations of the present disclosure, components implementing glass and components having catalytic performance may provide an optimal component system, thereby allowing readily cleaning of all contaminants without soaking the contaminants in water at room temperature.

In the enamel composition, the method for preparation thereof, and the cooking appliance using the same according to some implementations of the present disclosure, $Li_2O$, NaF and $V_2O_5$ may be added to ensure excellent high-temperature spreadability during burning. Further, a defect that may result from carbon gases when an enamel coating is applied to a cooktop grate made of a cast iron material may be suppressed, thereby preventing failure such as a crack and the like.

In the enamel composition according to some implementations of the present disclosure, components implementing glass and components having catalytic performance may provide an optimal component system, thereby ensuring excellent thermal shock resistance and durability.

Thus, the enamel composition, the method for preparation thereof and the cooking appliance using the same according to some implementations of the present disclosure may have a component system that helps enamel cast iron, such as high carbon steel including 1.5 or greater wt % of carbon, as well as low carbon steel, thereby ensuring excellent cleaning performance, thermal shock resistance and durability. Accordingly, the enamel composition according to some implementations of the present disclosure may be applied to a cooktop grate, a hob burner and the like that may directly contact a fire and be exposed to repetitive thermal shock.

Example specific effects are described together with the above-described effects in the section of Detailed Description.

BRIEF DESCRIPTION OF DRAWINGS

Implementations are described in detail with reference to the following drawings, wherein.

DETAILED DESCRIPTION

Figure 1:
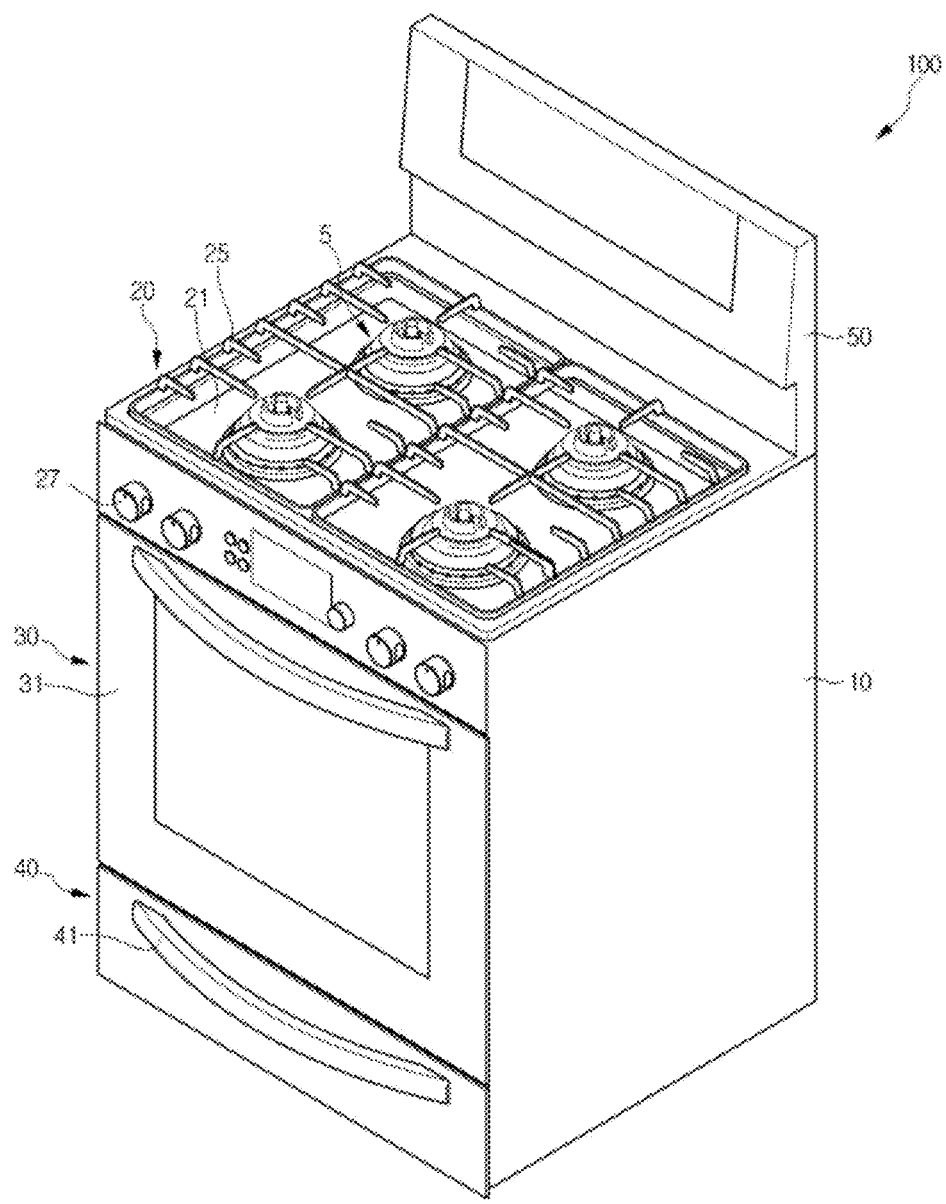
FIG. 1 is a perspective view showing a cooking appliance according to an implementation.

The above-described aspects, features and advantages are specifically described herein with reference to the accompanying drawings such that one having ordinary skill in the art to which the present disclosure pertains can easily implement the technical spirit in the disclosure. In the disclosure, detailed description of known technologies is omitted. Below, preferred implementations according to the disclosure are specifically described with reference to the accompanying drawings. Throughout the drawings, identical reference numerals can denote identical or similar components.

Below, an enamel composition and a method for preparation thereof, and a cooking appliance using the same according to some implementations are described.

Enamel Composition

Cast iron materials are usually used in manufacturing a cooktop grate, a hob burner and the like to ensure their formability. However, when the cooktop grate, the hob burner and the like are coated with an enamel composition to form an enamel coating layer, the cooktop grate, the hob burner and the like as a base material may be subject to a defect such as a crack due to large emissions of carbon gases during burning because the cooktop grate, the hob burner and the like may include a cast iron material that is high carbon steel including 1.5 or greater wt % of carbon.

If spreadability is not sufficiently ensured at a burning temperature, carbon gases may be accumulated between the enamel coating layer and the base material, and a crack is likely to occur at a position where carbon gases are accumulated, causing the base material to be broken.

To reduce or prevent a defect caused by carbon gases produced from a base material made of cast iron, excellent spreadability needs to be ensured at a burning temperature. That is, since a large amount of carbon gases are produced in the initial stage of the burning process, the burning process needs to be performed for a long period of time. A long period of burning may result in burning caused by a chemical reaction between the enamel coating layer and the base material. Accordingly, control over a period of burning is an important factor.

Additionally, when food is splattered from an object and heated during cooking, the food may be fixed and not readily cleaned. The cooktop, the hob burner and the like are often exposed to repetitive thermal shock because they are installed at a position directly contacting a fire. Against these circumstances, there is a growing need for an enamel composition that can ensure excellent thermal shock resistance.

To solve the above problems and other problems, in the enamel composition according to implementations, components implementing glass and components having catalytic performance may have an optimal component system, thereby allowing readily cleaning of all contaminants without soaking the contaminants in water at room temperature.

In the enamel composition according to implementations, $Li_2O$, NaF and $V_2O_5$ may be added to ensure excellent high-temperature spreadability during burning. Accordingly, a defect caused by carbon gases when an enamel coating is applied to a cooktop grate made of a cast iron material may be suppressed, thereby preventing failure such as a crack and the like.

In the enamel composition according to implementations, components implementing glass and components having catalytic performance may provide an optimal component system, thereby ensuring excellent thermal shock resistance and durability.

Thus, the enamel composition according to implementations of the present disclosure may have a component system that helps enamel cast iron, such as high carbon steel including 1.5 or greater wt % of carbon, as well as low carbon steel, thereby ensuring excellent cleaning performance, thermal shock resistance and durability. Further, the enamel composition according to implementations of the present disclosure may be applied to a cooktop grate, a hob burner and the like directly contacting a fire and exposed to repetitive thermal shock.

To this end, an enamel composition according to implementations may include 13 to 30 wt % of phosphorus pentoxide ($P_2O_5$), 20 to 45 wt % of silicon dioxide ($SiO_2$), 5 to 18 wt % of aluminum oxide ($Al_2O_3$), 10 or less wt % of zirconium dioxide ($ZrO_2$), 2 to 15 wt % of sodium oxide ($Na_2O$), 5 to 20 wt % of potassium oxide ($K_2O$), 1 to 10 wt % of lithium oxide ($Li_2O$), 5 or less wt % of sodium fluoride (NaF), 5 to 20 wt % of boron trioxide ($B_2O_3$), 5 or less wt % of titanium dioxide ($TiO_2$), and 10 or less wt % of vanadium oxide ($W_2O_5$). In some implementations, all of $P_2O_5$, $SiO_2$, $Al_2O_3$, $ZrO_2$, $Na_2O$, $K_2O$, $Li_2O$, NaF, $B_2O_3$, $TiO_2$, and $V_2O_5$ are present in the enamel composition.

For example, 5 or greater wt % of $Na_2O$ may be added.

The enamel composition according to implementations may further include 5 or less wt % of one or more of cobalt tetraoxide ($Co_3O_4$), manganese oxide ($MnO_2$), nickel oxide (NiO) and iron oxide ($Fe_2O_3$).

The role and content of each component of the enamel composition according to implementations are described herein.

$P_2O_5$ is a component that forms an alkali phosphate glass structure. $P_2O_5$ is also a glass former that helps ease addition of a large amount of transition metal oxides into the enamel composition, and helps water to permeate between an enamel surface and a contaminant such that the contaminant is easily removed. $P_2O_5$ content may preferably account for 13 to 30 wt % and more preferably account for 17 to 20 wt % of the entire weight of the enamel composition according to implementations of the present disclosure. When greater than 30 wt % of $P_2O_5$ is added, the enamel composition is hardly glazed, and thermal properties of the enamel composition may be deteriorated. Additionally, when less than 13 wt % of $P_2O_5$ is added, an amount of added transition metal oxides is reduced. Thus, cleaning performance may be deteriorated.

$SiO_2$, which is a component for forming a glass structure, reinforces a skeleton of the glass structure, enhances chemical resistance of the enamel composition, and helps readily reveal properties of a metal oxide serving as a catalyst. Since a metal oxide catalyst has inferior thermal resistance or chemical resistance than other components, the metal oxide catalyst may not be included in the enamel composition in large amounts. However, $SiO_2$ has a structure where pore sizes are large. Accordingly, when an adequate amount of $SiO_2$ is included, solubility of a metal oxide catalyst in the enamel composition may increase. Thus, when a content ratio of $SiO_2$ to a metal oxide catalyst is properly adjusted, excellent thermal resistance and chemical resistance and a revelation of properties of a metal oxide catalyst may be ensured.

$SiO_2$ content may preferably account for 20 to 45 wt % and more preferably account for 30 to 35 wt % of the entire weight of the enamel composition according to implementations of the present disclosure. Addition of greater than 45 wt % of $SiO_2$ may interfere with addition of other components and deteriorate cleaning performance. When less than 20 wt % of $SiO_2$ is added, improvement in chemical resistance may not be effectively ensured.

$Al_2O_3$ may improve durability of an alkali phosphate glass structure and may enhance hardness of an enamel surface. $Al_2O_3$ content may preferably account for 5 to 18 wt % and more preferably account for 6 to 10 wt % of the entire weight of the enamel composition according to implementations of the present disclosure. When greater than 18 wt % of $Al_2O_3$ is added, a melting point rises, and fusion flow increases. Accordingly, adhesion of the enamel coating layer may decrease. When less than 5 wt % of $Al_2O_3$ is added, durability of the enamel coating layer may decrease.

$ZrO_2$ is a component that enhances chemical durability and improves adhesion and thermal resistance of an alkali phosphate glass structure. When greater than 10 wt % of $ZrO_2$ is added, adhesion and thermal resistance of the enamel coating layer may decrease. Accordingly, $ZrO_2$ content may preferably account for 10 or less wt % and more preferably account for 3 to 6 wt % of the entire weight of the enamel composition according to implementations of the present disclosure.

$Na_2O$ is a component that acts along with $P_2O_5$ to improve cleaning performance. $Na_2O$ content may preferably account for 2 to 15 wt % of the entire weight of the enamel composition according to implementations of the present disclosure. When greater than 15 wt % of $Na_2O$ is added, a thermal expansion coefficient of glass may be extremely increased. Accordingly, coating performance may be deteriorated. When less than 2 wt % of $Na_2O$ is added, cleaning performance may be deteriorated. More preferably, 5 or greater wt % of $Na_2O$ may be included in the enamel composition according to implementations of the present disclosure.

$K_2O$ is a component that acts along with $Na_2O$ and $P_2O_5$ to improve cleaning performance. $K_2O$ content may preferably account for 5 to 20 wt % of the entire weight of the enamel composition according to implementations of the present disclosure. When greater than 20 wt % of $K_2O$ is added, a thermal expansion coefficient of glass may be extremely increased. Accordingly, coating performance may be deteriorated. When less than 5 wt % of $K_2O$ is added, cleaning performance may be deteriorated.

$Li_2O$ serves as a catalyst that restricts a defect caused by gas's decarbonization on a surface of the enamel coating layer coated on the cooktop grate made of a cast iron material, and is a component that facilitates carbonization of contaminants.

$Li_2O$ content may preferably account for 1 to 10 wt % and more preferably account for 2 to 5 wt % of the entire weight of the enamel composition according to implementations of the present disclosure. When greater than 10 wt % of $Li_2O$ is included, addition of another component may be interfered with, and durability may decrease. When less than 1 wt % of $Li_2O$ is added, the effect of suppressing a defect caused by gas's decarbonization may be reduced.

Along with $Li_2O$, NaF serves as a catalyst that suppresses a defect caused by gas's decarbonization on the surface of the enamel coating layer, and facilitates carbonization of contaminants. Additionally, NaF is a component that adjusts viscosity along with $Li_2O$ at the time of enamel coating. If viscosity is too low at a burning temperature, a surface may have a defect, and if viscosity is too low, an interface may have a defect. Accordingly, viscosity needs to be properly adjusted by adding NaF and $Li_2O$.

When greater than 5 wt % of NaF is added in the enamel composition according to implementations of the present disclosure, the enamel composition is hardly glazed, and thermal properties of the enamel composition may be deteriorated. Accordingly, NaF content may preferably account for 5 or less wt % of the entire weight of the enamel composition according to implementations of the present disclosure.

$B_2O_3$ serves as a glass former and helps each component of the enamel composition melt uniformly. $B_2O_3$ enhances coating performance by adjusting the thermal expansion coefficient and the high-temperature spreadability of the enamel composition. Additionally, $B_2O_3$ may help maintain adequate viscosity during the burning of enamel and prevent crystallization of an enamel composition. $B_2O_3$ content may preferably account for 5 to 20 wt % and more preferably account for 8 to 12 wt % of the entire weight of the enamel composition according to implementations of the present disclosure. When greater than 20 wt % of $B_2O_3$ is added, addition of another component may be interfered with, and cleaning performance may be deteriorated. When less than 5 wt % of $B_2O_3$ is added, glass composition may be collapsed, and crystallization of an enamel composition may occur.

Along with $Al_2O_3$, $TiO_2$ improves durability of an alkali phosphate glass structure, and enhances hardness of an enamel surface. When greater than 5 wt % of $TiO_2$ is added, a melting temperature may rise, and a fusion flow may increase, resulting in a decrease on adhesion of the enamel coating layer. Accordingly, $TiO_2$ content may preferably account for 5 or less wt % of the entire weight of the enamel composition according to implementations of the present disclosure.

Along with $Li_2O$ and NaF, $V_2O_5$ serves as a catalyst that restricts a defect caused by gas's decarbonization on the surface of the enamel coating layer, and facilitates carbonization of contaminants. However, when greater than 10 wt % of $V_2O_5$ is added, vitrification may be hardly achieved, and thermal properties may be deteriorated. Accordingly, $V_2O_5$ content may preferably account for 10 or less wt % of the entire weight of the enamel composition according to implementations of the present disclosure.

One or more of $Co_3O_4$, $MnO_2$, NiO and $Fe_2O_3$ are components that further enhance adhesion with a base material. Specifically, in the enamel composition according to implementations of the present disclosure, $CO_3O_4$, $MnO_2$, NiO and $Fe_2O_3$ are mainly used to improve cleaning performance against contaminants such as fat. Further, in the enamel composition according to the disclosure, $CO_3O_4$ is a component that improves cleaning performance against contaminants such as sugar.

However, when greater than 5 wt % of one or more of $Co_3O_4$, $MnO_2$, NiO and $Fe_2O_3$ is added, addition of another component may be interfered with, and cleaning performance may be deteriorated.

Additionally, in the enamel composition according to implementations of the present disclosure, $CO_3O_4$, $MnO_2$, NiO and $Fe_2O_3$ are components that enhance adhesion of the enamel coating. The components of $CO_3O_4$, $MnO_2$, NiO and $Fe_2O_3$ may serve as color implementation elements of the enamel coating.

Method for Preparation of Enamel Composition

A method for preparation of an enamel composition according to implementations of the present disclosure may include providing an enamel composition material including 13 to 30 wt % of phosphorus pentoxide ($P_2O_5$), 20 to 45 wt % of silicon dioxide ($SiO_2$), 5 to 18 wt % of aluminum oxide ($Al_2O_3$), 10 or less wt % of zirconium dioxide ($ZrO_2$), 2 to 15 wt % of sodium oxide ($Na_2O$), 5 to 20 wt % of potassium oxide ($K_2O$), 1 to 10 wt % of lithium oxide ($Li_2O$), 5 or less wt % of sodium fluoride (NaF), 5 to 20 wt % of boron trioxide ($B_2O_3$), 5 or less wt % of titanium dioxide ($TiO_2$) and 10 or less wt % of vanadium oxide ($V_2O_5$), melting the enamel composition material, and cooling the melted enamel composition material.

In the process, the melting step may be performed at 1,300 to 1,500° C. for 30 to 60 minutes, for example.

Then the melted enamel composition material may be rapidly cooled by a chiller, for example, such as a quenching roller. Thus, the enamel composition may be formed.

Herein, 5 or greater wt % of $Na_2O$ may be added, for example.

The enamel composition material may further include 5 or less wt % of one or more of cobalt tetraoxide ($CO_3O_4$), manganese oxide ($MnO_2$), nickel oxide (NiO) and iron oxide ($Fe_2O_3$).

Cooking Appliance

Figure 2:
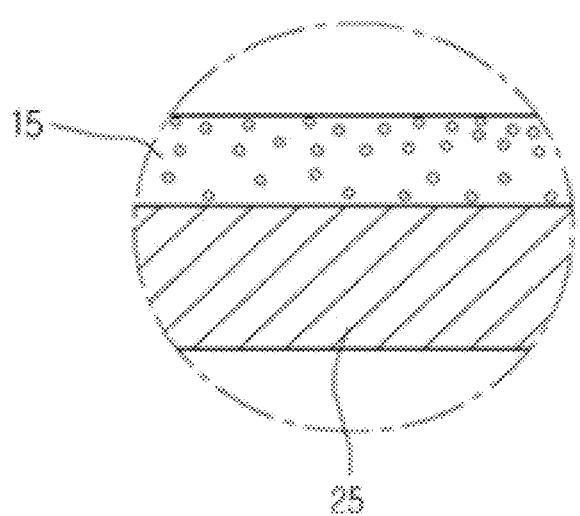
FIG. 2 is an enlarged cross-sectional view showing the grate portion in FIG. 1.

FIG. 1 is a perspective view showing a cooking appliance according to an implementation, and FIG. 2 is an enlarged cross-sectional view showing the grate portion in FIG. 1.

A cooking appliance 100 according to implementations, as shown in FIG. 1, may include a cabinet 10, a cooktop unit 20 and an oven unit 30. The cooking appliance 100 may further include a drawer unit 40 and a control panel 50.

The cabinet 10 may form an exterior of the cooking appliance 100, and may have a hexahedron box shape. The shape of the cabinet 10 is not limited to the illustrated example.

The cooktop unit 20 may be mounted onto an upper portion of the cabinet 10 and may have at least one grate 25 for supporting an object to be cooked which is heated by a burner 5.

The cooktop unit 20 may further include a top plate 21 and an operation knob 27. Apparently, the number of the burners 5 can vary, although the top plate 21 provided thereon with four burners 5 is given as an example. The burner 5 may burn gas that is mixed with air and make a fire for cooking an object. The operation knob 27 may be mounted to control an operation of the burner 5.

The oven unit 30 may be disposed in the cabinet 10 at a lower portion or in a downward direction of the cooktop unit 20, and may have a cavity forming a cooking space. The oven unit 30 may include a door 31 configured to selectively open and close the cooking space. That is, the oven unit 30 may have a cooking space where an object is cooked. The cooking space may be selectively opened and closed by the door 31. In some cases, a heat source for heating an object may include, for example, at least one of a broil burner, a bake burner and a convention device, and may be installed in the cooking space.

The drawer unit 40 may be disposed in the cabinet 10 at a lower portion or in a downward direction of the oven unit 30. The drawer unit 40 may warm a vessel that contains an object to be cooked. The drawer unit 40 may be drawn into and out of the cabinet 10 and may include a drawer 41 that stores a vessel.

In some implementations, the control panel 50 may be disposed at a rear end of an upper surface of the cabinet 10, corresponding to a rear of the cooktop unit 20. The control panel 50 may receive a signal for operations of the oven unit 30 and drawer unit 40 and display information of the operations of the oven unit 30 and drawer 40.

The cooking appliance 100 according to implementations, as shown in FIGS. 1 and 2, may further include an enamel coating layer 15.

The enamel coating layer 15 may be coated on at least one of a surface of the grate 25, an inner surface of the cavity, an inner surface of the door 31, and an inner surface of door glass disposed at the door 31. FIG. 2 shows an example where the enamel coating layer 15 is coated on the grate 25 of the cooktop unit 20.

The enamel coating layer 15 may include 13 to 30 wt % of phosphorus pentoxide ($P_2O_5$), 20 to 45 wt % of silicon dioxide ($SiO_2$), 5 to 18 wt % of aluminum oxide ($Al_2O_3$), 10 or less wt % of zirconium dioxide ($ZrO_2$), 2 to 15 wt % of sodium oxide ($Na_2O$), 5 to 20 wt % of potassium oxide ($K_2O$), 1 to 10 wt % of lithium oxide ($Li_2O$), 5 or less wt % of sodium fluoride (NaF), 5 to 20 wt % of boron trioxide ($B_2O_3$), 5 or less wt % of titanium dioxide ($TiO_2$), and 10 or less wt % of vanadium oxide ($V_2O_5$).

In some implementations, the enamel coating layer 15 may entirely cover an exposed surface of the grate 25.

For the enamel coating layer according to implementations of the present disclosure, components implementing glass and components having catalytic performance have an optimal component system, thereby making it possible to easily clean all contaminants without soaking the contaminants in water at room temperature, as described above.

The enamel coating layer according to implementations of the present disclosure may ensure excellent high-temperature spreadability during burning as a result of addition of $Li_2O$, NaF and $V_2O_5$ such that failure such as a crack and the like is prevented based on the effect of suppressing a defect caused by carbon gases when an enamel coating is applied to a cooktop grate made of a cast iron material.

For the enamel coating layer according to implementations of the present disclosure, components implementing glass and components having catalytic performance have an optimal component system, thereby ensuring excellent thermal shock resistance and durability.

Since the enamel coating layer according to implementations of the disclosure has a component system that may help enamel cast iron, which is high carbon steel including 1.5 or greater wt % of carbon, as well as low carbon steel, the enamel coating layer may ensure excellent cleaning performance, thermal shock resistance and durability, and may be applied to a cooktop grate directly contacting a fire and exposed to repetitive thermal shock.

EXAMPLES

Below, example configurations and operations according to the present disclosure are described with reference to preferred implementations. However, the implementations below are provided as examples and should not be construed as being limited in any aspect.

Details that can be technically inferred by one skilled in the art will be omitted for brevity.

1. Preparation of Enamel Composition

According to examples 1 to 3 and comparative example 1, enamel compositions having the composition ratios in table 1 were prepared. In this case, raw materials for each component were sufficiently mixed in a V-mixer for 3 hours. Sodium carbonate ($Na_2CO_3$), potassium carbonate ($K_2CO_3$), and lithium carbonate ($Li_2CO_3$) were respectively used as raw materials for $Na_2O$, $K_2O$, and $Li_2O$. The remaining components were identical with the components except for $Na_2O$, $K_2O$, and $Li_2O$ in table 1. The mixed materials were melted at 1400° C. for 50 minutes and were rapidly cooled in a quenching roller. Then a glass cullet was obtained.

The glass cullet was mixed with acetone to which 0.5 wt % of organopolysiloxane (DOW Corning 1107) was added, was ground for 5 hours using a ball mill, dried, and then passed through a 325 mesh sieve (ASTM C285-88) to have a particle size of 45 μm or less. Powder having passed through the mesh sieve, as described above, was used as an enamel composition frit.

TABLE 1

(Unit: wt %)

| Component | Example 1 | Example 2 | Example 3 | Comparative example 1 |
|---|---|---|---|---|
| $P_2O_5$ | 17.8 | 18.2 | 13.8 | 9.8 |
| $SiO_2$ | 32.7 | 25.3 | 28.5 | 43.2 |
| $Al_2O_3$ | 6.2 | 5.84 | 8.0 | 6.0 |
| $ZrO_2$ | 4.9 | 5.5 | 4.3 | 2.3 |
| $Na_2O$ | 4.2 | 7.2 | 4.5 | 4.4 |
| $K_2O$ | 10.7 | 13.7 | 9.7 | 11.0 |
| NaF | 1.2 | 1.0 | 1.1 | 1.2 |
| $Li_2O$ | 3.0 | 3.5 | 4.0 | 2.9 |
| $B_2O_3$ | 10.4 | 10.8 | 13.4 | 10.5 |
| $TiO_2$ | 1.0 | 0.5 | 1.0 | 1.1 |
| $V_2O_5$ | 5.7 | 6.0 | 9.7 | 5.8 |
| $Co_3O_4$ + $MnO_2$ + NiO + $Fe_2O_3$ | 2.2 | 2.4 | 2.5 | 2.0 |
| Total | 100 | 100 | 100 | 100 |

Preparation of Enamel Sample

The enamel composition frits, which were prepared using the enamel compositions according to examples 1 to 3, and comparative example 1, were respectively sprayed onto a cast iron sheet having a width of 200 mm, a height of 100 mm, and a thickness of 1 mm, using a corona discharge gun. A voltage of the corona discharge gun was controlled under the conditions of 40 kV to 100 kV, and an amount of the frits sprayed and coated on the cast iron sheet was 300 g/m2.

The cast iron sheet, onto which the enamel composition frits were sprayed and coated, was burned at 860° C. for 600 seconds to form a 200 μm-thick coating layer on one surface of the cast iron sheet. Accordingly, enamel samples were prepared according to examples 1 to 3, and comparative example 1.

2. Evaluation of Physical Property

Table 2 shows results of evaluation of physical properties of the enamel samples according to examples 1 to 3 and comparative example 1.

1) Softening Point and Thermal Expansion Coefficient

Both surfaces of the enamel samples according to examples 1 to 3 and comparative example 1 were polished and leveled flatly, and then heated at a heating rate of 10° C./min until just after a softening point (Ts) to measure softening points and thermal expansion coefficients using a Thermomechanical Analyzer (TMA).

2) Chemical Resistance

Acid resistance and alkali resistance of the enamel samples according to examples 1 to 3 and comparative example 1 were measured. To evaluate acid resistance, a few drops of a 10 wt % citric acid solution were added onto the enamel samples. After 15 minutes passed, the solution was wiped out, and then a change on surfaces of the enamel samples was observed.

Evaluation of alkali resistance was performed in the same way as the evaluation of acid resistance. To evaluate alkali resistance, a 10 wt % anhydrous sodium carbonate solution was used as a reagent. Herein, levels indicating acid resistance and alkali resistance were evaluated using the ASTM ISO 2722 method. Grade AA denotes excellent, A denotes good, B denotes average, C denotes below average, and D denotes poor.

3) Cleaning Performance

To measure cleaning performance, one gram of olive oil was evenly and thinly applied as a contaminant onto the surfaces of the enamel samples according to examples 1 to 3 and comparative example 1, with a brush. Then, the samples, to which the contaminant was applied, were put into a thermostat and the contaminant was fixed at 240° C. for an hour.

After the contaminant was fixed, the samples were cooled naturally, and, after hardness of the contaminant was checked, were submerged in a water tank having water of 25° C. for 10 minutes. Then, the hardened olive oil was cleaned with wet cloth using a force of 2.5 kgf or less. Cleaned portions of the contaminated surfaces of the enamel samples were uniformized using a rod having a flat bottom and a diameter of 5 cm. In this case, frequency of back and forth cleaning motions was measured, and the frequency was defined as frequency of cleaning motions.

TABLE 2

| Category | Example 1 | Example 2 | Example 3 | Comparative example 1 |
|---|---|---|---|---|
| Softening point(° C.) | 548 | 489 | 526 | 578 |
| Thermal expansion coefficient | 105 × $10^{-7}$/° C. | 126 × $10^{-7}$/° C. | 117 × $10^{-7}$/° C. | 92 × $10^{-7}$/° C. |
| Acid resistance | AA | A | AA | AA |
| Alkali resistance | AA | AA | AA | AA |
| Cleaning performance | 5 | 5 | 5 | 3 |

As shown in table 1 and table 2, the enamel sample according to example 1 had a softening point of 548° C., a thermal expansion coefficient of 105×$10^{-7}$/° C., chemical resistance of AA and cleaning performance of 5. Thus, table 1 and table 2 show that the enamel sample according to example 1 has excellent properties.

Additionally, the enamel sample according to example 2 had a softening point of 489° C., a thermal expansion coefficient of $126 \times 10^{-7}$/° C., chemical resistance of A and cleaning performance of 5. Thus, the enamel sample according to example 2 also has excellent properties.

Further, the enamel sample according to example 3 had a softening point of 526° C., a thermal expansion coefficient of $117 \times 10^{-7}$/° C., chemical resistance of AA and cleaning performance of 5. Thus, the enamel sample according to example 3 also has excellent properties.

However, the enamel sample according to comparative example 1 had a softening point of 578° C. and a thermal expansion coefficient of $92 \times 10^{-7}$/° C. Additionally, the enamel sample according to comparative example 1 had chemical resistance of AA while having cleaning performance of 3. Thus, the enamel sample according to comparative example 1 reaches an average level.

The enamel sample according to comparative example 1 showed low-quality cleaning performance. It seems that addition of a small amount of $P_2O_5$, which is below the range suggested in the disclosure, contributes to the low-quality cleaning performance.

Although the implementations have been described with reference to a number of illustrative implementations thereof, it is apparent that the present disclosure is not intended to limit the implementations and drawings set forth herein and that numerous other modifications and implementations can be devised by those skilled in the art that will fall within the spirit and scope of the principles of this disclosure. Further, the effects and predictable effects based on the configurations in the disclosure are to be included within the range of the disclosure though not explicitly described in the description of the implementations.

What is claimed is:

1. An enamel composition consisting of:
   13 to 30 wt % of phosphorus pentoxide ($P_2O_5$);
   20 to 45 wt % of silicon dioxide ($SiO_2$);
   5 to 18 wt % of aluminum oxide ($Al_2O_3$);
   10 or less wt % of zirconium dioxide ($ZrO_2$);
   2 to 15 wt % of sodium oxide ($Na_2O$);
   5 to 20 wt % of potassium oxide ($K_2O$);
   2 to 5 wt % of lithium oxide ($Li_2O$);
   1 to 5 wt % of sodium fluoride (NaF);
   8 to 12 wt % of boron trioxide ($B_2O_3$);
   5 or less wt % of titanium dioxide ($TiO_2$);
   5.7 to 10 wt % of vanadium oxide ($V_2O_5$); and
   5 or less wt % in total of (i) cobalt tetraoxide ($Co_3O_4$) and (ii) one or more of manganese oxide ($MnO_2$), nickel oxide (NiO), and iron oxide ($Fe_2O_3$).

2. The enamel composition of claim 1, wherein the enamel composition comprises 5 or greater wt % of $Na_2O$.

3. A method for preparation of an enamel composition, comprising:
   providing an enamel composition material that consists of 13 to 30 wt % of phosphorus pentoxide ($P_2O_5$), 20 to 45 wt % of silicon dioxide ($SiO_2$), 5 to 18 wt % of aluminum oxide ($Al_2O_3$), 10 or less wt % of zirconium dioxide ($ZrO_2$), 2 to 15 wt % of sodium oxide ($Na_2O$), 5 to 20 wt % of potassium oxide ($K_2O$), 2 to 5 wt % of lithium oxide ($Li_2O$), 1 to 5 wt % of sodium fluoride (NaF), 8 to 12 wt % of boron trioxide ($B_2O_3$), 5 or less wt % of titanium dioxide ($TiO_2$), 5.7 to 10 wt % of vanadium oxide ($V_2O_5$); and 5 or less wt % in total of (i) cobalt tetraoxide ($Co_3O_4$) and (ii) one or more of manganese oxide ($MnO_2$), nickel oxide (NiO), and iron oxide ($Fe_2O_3$);
   melting the enamel composition material; and
   cooling the melted enamel composition material.

4. The method of claim 3, wherein the enamel composition material comprises 5 or greater wt % of $Na_2O$.

5. The method of claim 3, wherein the enamel composition material further-comprises:
   1 to 5 wt % of one or more of cobalt tetraoxide ($Co_3O_4$), manganese oxide ($MnO_2$), nickel oxide (NiO) and iron oxide ($Fe_2O_3$).

6. A cooking appliance comprising:
   a cabinet;
   a cooktop unit positioned at the cabinet and having at least one grate configured to support an object to be cooked, the cooking unit including by a burner configured to heat the object; and
   an enamel coating layer coated on a surface of the grate, wherein the enamel consists of includes 13 to 30 wt % of phosphorus pentoxide ($P_2O_5$), 20 to 45 wt % of silicon dioxide ($SiO_2$), 5 to 18 wt % of aluminum oxide ($Al_2O_3$), 10 or less wt % of zirconium dioxide ($ZrO_2$), 2 to 15 wt % of sodium oxide ($Na_2O$), 5 to 20 wt % of potassium oxide ($K_2O$), 2 to 5 wt % of lithium oxide ($Li_2O$), 1 to 5 wt % of sodium fluoride (NaF), 8 to 12 wt % of boron trioxide ($B_2O_3$), 5 or less wt % of titanium dioxide ($TiO_2$), 5.7 to 10 wt % of vanadium oxide ($V_2O_5$); and 5 or less wt % in total of (i) cobalt tetraoxide ($Co_3O_4$) and (ii) one or more of manganese oxide ($MnO_2$), nickel oxide (NiO), and iron oxide ($Fe_2O_3$).

7. The cooking appliance of claim 6, further comprising:
   an oven unit positioned in the cabinet and defining a cavity.

8. The cooking appliance of claim 7, wherein the enamel coating layer is coated on an inner surface of the cavity.

9. The cooking appliance of claim 7, wherein the oven unit includes a door opening and closing the cavity.

10. The cooking appliance of claim 9, wherein the enamel coating layer is coated on an inner surface of the door.

11. The cooking appliance of claim 9, wherein the door includes a door glass.

12. The cooking appliance of claim 11, wherein the enamel coating layer is coated on an inner surface of the door glass.

13. The cooking appliance of claim 6, wherein the enamel coating layer fully covers an exposed surface of the grate.

14. The cooking appliance of claim 6, wherein the grate includes a cast iron material.

15. The cooking appliance of claim 14, wherein the cast iron material includes 1.5 or greater wt % of carbon.

16. The enamel composition of claim 1, wherein the enamel composition includes 17 to 20 wt % of $P_2O_5$.

17. The enamel composition of claim 1, wherein the enamel composition includes 30 to 35 wt % of $SiO_2$.

18. The enamel composition of claim 1, wherein the enamel composition includes 6 to 10 wt % of $Al_2O_3$.

19. The enamel composition of claim 1, wherein the enamel composition includes 3 to 6 wt % of $ZrO_2$.

* * * * *